(12) United States Patent
Bernat et al.

(10) Patent No.: US 11,500,681 B2
(45) Date of Patent: Nov. 15, 2022

(54) TECHNOLOGIES FOR MANAGING QUALITY OF SERVICE PLATFORM INTERCONNECTS

(71) Applicant: Intel Corporation, Santa Clara, CA (US)

(72) Inventors: Francesc Guim Bernat, Barcelon (ES); Kshitij A. Doshi, Tempe, AZ (US); Andrew J. Herdrich, Hillsboro, OR (US); Edwin Verplanke, Chandler, AZ (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 15/637,003

(22) Filed: Jun. 29, 2017

(65) Prior Publication Data

US 2019/0004862 A1 Jan. 3, 2019

(51) Int. Cl.
*G06F 9/50* (2006.01)
*H04L 67/1008* (2022.01)
*G06F 13/38* (2006.01)
*G06F 9/46* (2006.01)

(52) U.S. Cl.
CPC .......... *G06F 9/5038* (2013.01); *G06F 9/5005* (2013.01); *G06F 9/505* (2013.01); *G06F 9/5083* (2013.01); *H04L 67/1008* (2013.01); *G06F 9/46* (2013.01); *G06F 13/38* (2013.01); *G06F 2209/501* (2013.01); *G06F 2209/5021* (2013.01)

(58) Field of Classification Search
None
See application file for complete search history.

(56) References Cited

U.S. PATENT DOCUMENTS

| | | | | |
|---|---|---|---|---|
| 7,353,362 B2* | 4/2008 | Georgiou | ............ | G06F 15/7832 712/33 |
| 7,467,243 B2* | 12/2008 | Rashid | .................... | H04L 49/00 709/233 |
| 8,230,107 B2* | 7/2012 | Tantawi | .............. | G06F 11/3433 709/235 |

(Continued)

OTHER PUBLICATIONS

Gmach et al. "Satisfying Service Level Objectives in a Self-Managing Resource Pool", 2009 IEEE, pp. 243-253.*

(Continued)

*Primary Examiner* — Van H Nguyen
(74) *Attorney, Agent, or Firm* — Compass IP Law PC

(57) ABSTRACT

A compute device includes one or more processors, one or more resources capable of being utilized by the one or more processors, and a platform interconnect to facilitate communication of messages between the one or more processors and the one or more resources. The compute device is to obtain class of service data for one or more workloads to be executed by the compute device. The class of service data is indicative of a capacity of one or more of the resources to be utilized in the execution of each corresponding workload. The compute device is also to execute the one or more workloads and manage the amount of traffic transmitted through the platform interconnect for each corresponding workload as a function of the class of service data as the one or more workloads are executed.

28 Claims, 8 Drawing Sheets

(56) References Cited

U.S. PATENT DOCUMENTS

| | | | | |
|---|---|---|---|---|
| 8,769,201 B2* | 7/2014 | Hasenplaugh | ...... | G06F 12/0802 |
| | | | | 711/118 |
| 9,202,002 B2* | 12/2015 | Mangano | ............ | H04L 49/3009 |
| 9,251,517 B2* | 2/2016 | Bonilla | ................. | H04L 41/145 |
| 9,465,771 B2* | 10/2016 | Davis | ..................... | G06F 1/266 |
| 9,769,050 B2* | 9/2017 | Herdrich | ............. | H04L 41/5009 |
| 10,554,505 B2* | 2/2020 | Ganguli | .............. | H04L 41/5025 |
| 2005/0086361 A1* | 4/2005 | Rashid | ................. | H04L 49/109 |
| | | | | 709/233 |
| 2008/0301696 A1* | 12/2008 | Tantawi | ............. | G06F 11/3433 |
| | | | | 718/105 |

OTHER PUBLICATIONS

Hoganson et al. "Workload Execution Strategies and Parallel Speedup on Clustered Computers", 1999 IEEE, pp. 1173-1182.*

Kuhnle et al. "An Interconnect Strategy for a Heterogeneous, Reconfigurable SoC", 2008 IEEE, pp. 442-541.*

Nava et al. "An Open Platform for Developing Multiprocessor SoCs", 2005 IEEE, pp. 60-67.*

Brinkmann et al. "On-Chip Interconnects for Next Generation System-on-Chips", 2002 IEEE, pp. 211-215.*

* cited by examiner

TECHNOLOGIES FOR MANAGING QUALITY OF SERVICE PLATFORM INTERCONNECTS

BACKGROUND

In typical compute devices, separate cores of a processor may execute different workloads (e.g., applications, threads, etc.) and utilize other resources, such as cache, memory, data storage, network communication circuitry, through a platform interconnect, which may be embodied as any device(s) or circuitry (e.g., a high speed platform fabric) capable of transmitting messages between components in the compute device. The workloads executed by the compute device may have certain quality of service standards (e.g., latency, throughput, etc.) associated with them, such as pursuant to a service level agreement between a customer and an operator of cloud data center in which the compute device is located. When multiple workloads are executed within the same compute device, the platform interconnect may become saturated with messages from or to one of the cores associated with one of the workloads, to the detriment of the other cores executing the other workloads, thereby adversely affecting the quality of service for some of the workloads. Typically, to guard against saturation of the platform interconnect, the platform interconnect is overprovisioned, such that it has more data transmission capacity (e.g., more data transmission circuitry) than is likely to be used during normal operation. The overprovisioning of the platform interconnect results in excess costs that could have been invested elsewhere in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
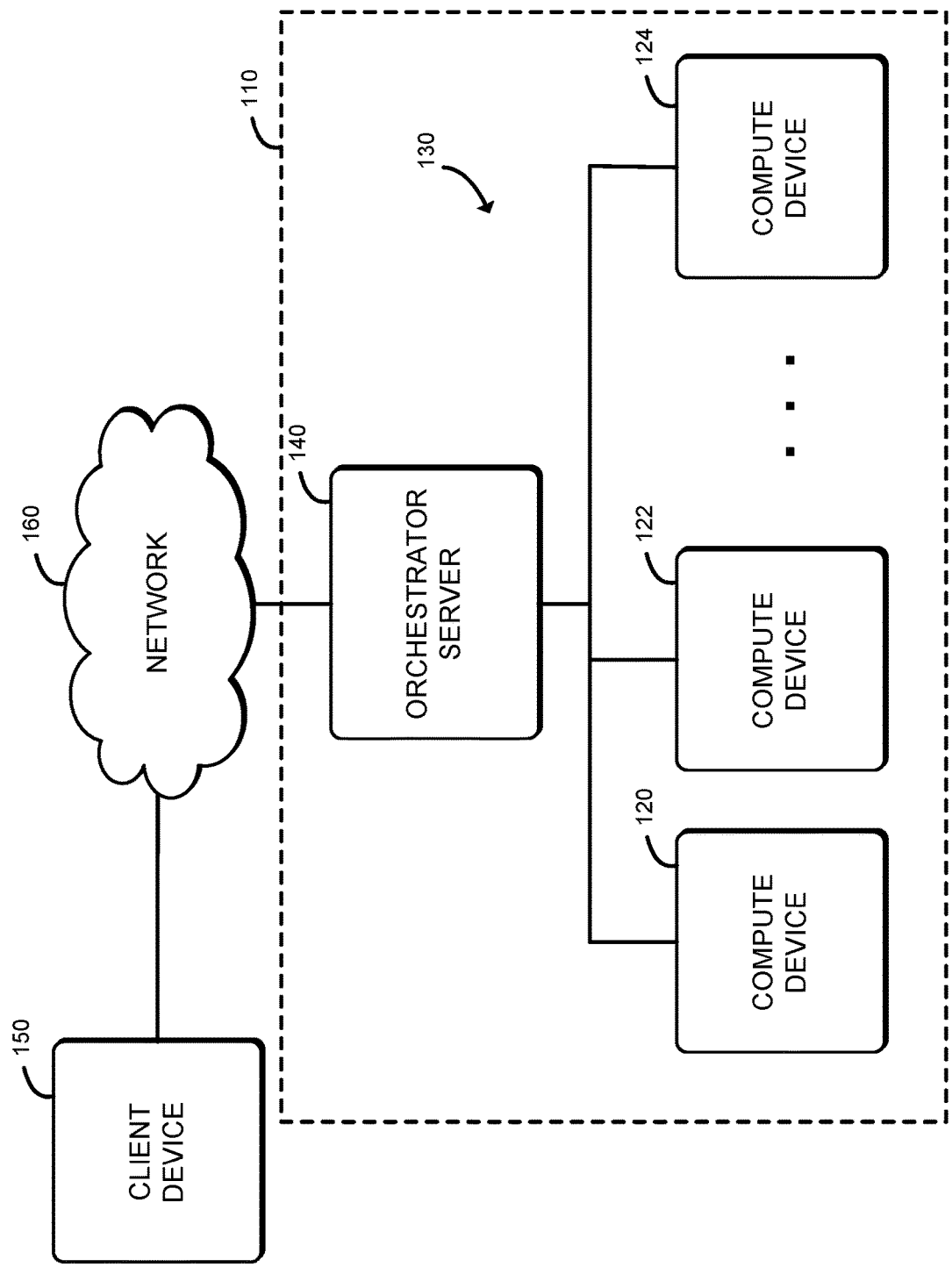
FIG. 1 is a simplified block diagram of at least one embodiment of a system for managing quality of service for platform interconnects.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 110 for managing quality of service for platform interconnects includes a set of compute devices 130 in communication with an orchestrator server 140. The set includes compute devices 120, 122, and 124. While three compute devices 130 are shown, it should be understood that in other embodiments, the set may include a different number of compute devices 130. In operation, each compute device 130 executes one or more workloads (e.g., applications) assigned to it. The workloads may be assigned by the orchestrator server 140, such as in response to a request for services from a client device 150 in communication with the orchestrator server 140 through a network 160, or from another source. In the illustrative embodiment, each compute device 130 obtains class of service data, which may be embodied as any data indicative of a capacity of one or more resources (e.g., memory throughput, data storage throughput, network communication circuitry throughput, etc.) to be allocated to each workload to enable the compute device to satisfy quality of service standards associated with the workloads, such as minimum throughputs or maximum latencies, which may be defined in a service level agreement with a customer. Further, in the illustrative embodiment, each compute device 130 monitors and controls the transmission of messages through the platform interconnect from the cores of the compute device to the resources (e.g., memory, data storage, network communication circuitry, etc.) associated with the classes of service and vice versa. For example, in the illustrative embodiment, a compute device 130 may selectively allow or delay transmission of a message from a core of the compute device 130 to a resource (e.g., to request data from the main memory), and similarly, selectively allow or delay the transmission of a message from the resource (e.g., a message containing requested data or other information), as a function of the class of service associated with the resource for a given workload. In doing so, the compute device 130 may establish different classes of service for different channels (e.g., virtual channels) for communication of information between components of the compute device 130. As such, in the illustrative embodiment, the compute device 130 apportions the amount of traffic that may be sent through platform interconnect for each workload and resource in accordance with quality of service standards expected by customers (e.g., pursuant to service level agreements) and reduces the likelihood that the platform interconnect will inadvertently become saturated with messages associated with one workload to the detriment of other workloads.

Figure 2:
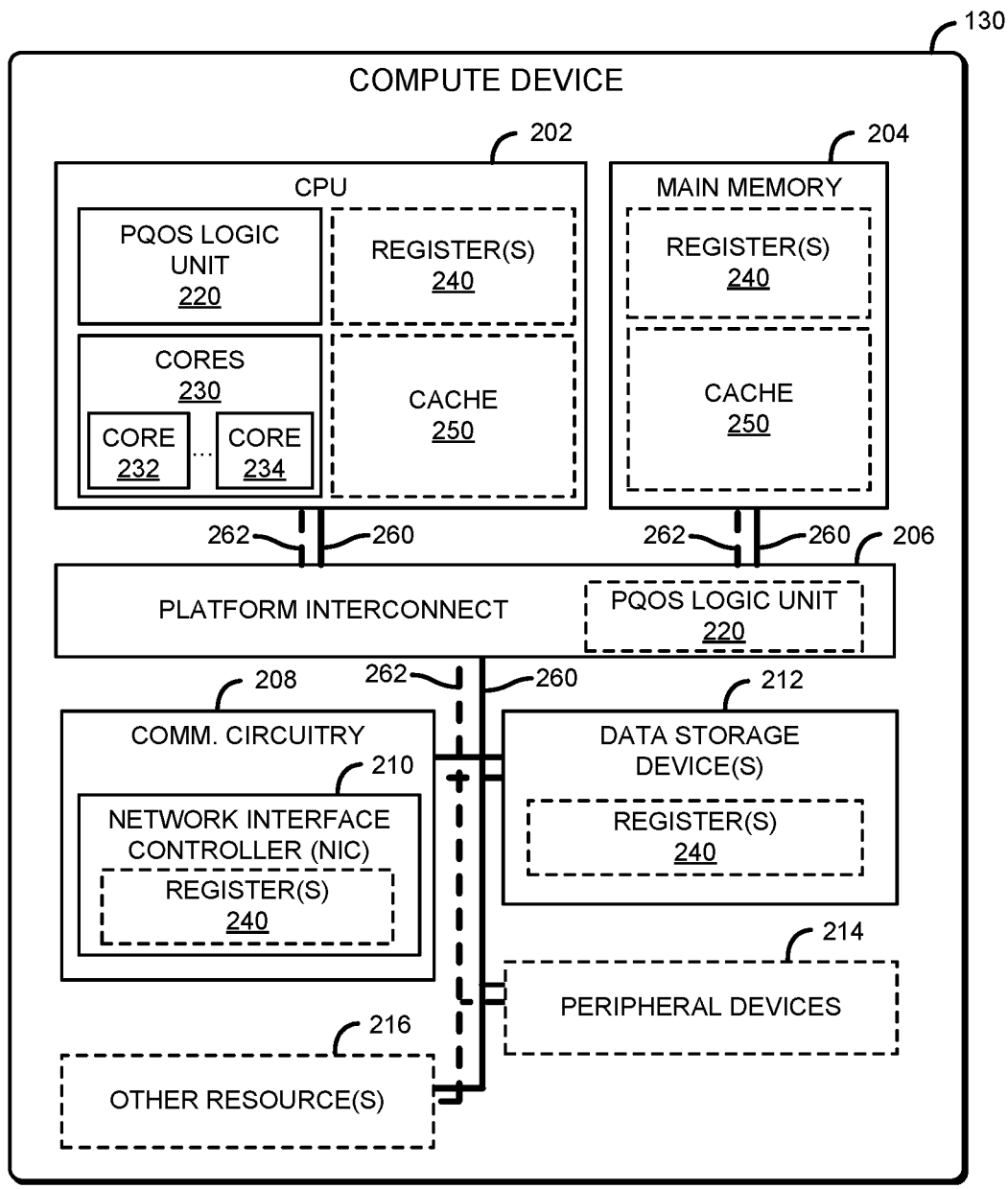
FIG. 2 is a simplified block diagram of at least one embodiment of a compute device of the system of FIG. 2.

Referring now to FIG. 2, each compute device 130 may be embodied as any type of device capable of performing the functions described herein. For example, in some embodiments, each compute device 130 may be embodied as, without limitation, a rack-mounted computer, a distributed computing system, a server computer, a desktop computer, a workstation, a laptop computer, a notebook computer, a tablet computer, a smartphone, a multiprocessor system, a consumer electronic device, a smart appliance, and/or any other device capable of obtaining class of service data for a workload to be executed, executing the workload, and controlling the number of messages transmitted through a platform interconnect of the compute device 130 commensurate with the classes of service associated with the workloads. As shown in FIG. 2, the illustrative compute device 130 includes a central processing unit (CPU) 202, a main memory 204, a platform interconnect 206, communication circuitry 208, and one or more data storage devices 212. Of course, in other embodiments, the compute device 130 may include other or additional components, such as those commonly found in a computer (e.g., peripheral devices, a display, etc.) and/or other resources 216 (e.g., one or more accelerators). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor or processors capable of performing the functions described herein. As such, the CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 202 includes a platform quality of service (pQoS) logic unit 220, which may be embodied as any device or circuitry capable of obtaining the class of service data for each workload to be executed, determining amounts of credits to be associated with each component of the compute device 130 that communicates through the platform interconnect 206 (e.g., a high speed platform fabric) in accordance with the class of service data (e.g., more credits for classes of service indicative of relatively higher memory throughputs, relatively higher communication circuitry throughput, etc. and fewer credits for classes of service indicative of relatively lower throughputs from the resources), associating the credits with the components of the compute device 130, such as by writing credit amounts to registers associated with the components, and selectively allowing or delaying the transmission of messages between the components as a function of whether the sending component has sufficient credits (e.g., a threshold amount, such as one credit per message).

In the illustrative embodiment, the CPU 202 includes multiple cores 230 which may be embodied as any devices capable of separately executing applications and utilizing other resources of the compute device (e.g., the main memory 204, the communication circuitry 208, low level cache (LLC) 250, etc.) in the execution of the workloads. In the embodiment illustrated in FIG. 2, two cores 232, 234 are shown. However, it should be understood that the number of cores 230 may differ in other embodiments. Additionally, in the illustrative embodiment, the CPU 202 includes one or more registers 240, such as model-specific registers (MSRs). As described in more detail herein, each register 240 may be embodied as any device or circuitry capable of storing a value that may be accessed (read and/or written to) by the compute device 130. In the illustrative embodiment, one or more of the registers 240 may indicate the present number of credits available to each core 230 executing a workload to transmit a message through the platform interconnect 206 (e.g., a high speed platform fabric) to another component. Additionally, in the illustrative embodiment, the CPU 202 includes the cache 250 which may be embodied as any device or circuitry capable of temporarily storing copies of data from frequently used locations of the main memory 204 and providing the cores 230 with relatively faster access (i.e., as compared to the main memory 204) to the data. The cache 250 may be communicatively coupled to the cores 230 through a portion of the platform interconnect 206, as described herein.

The main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as data utilized by the workloads executed by the cores 230, class of service data, operating systems, applications, programs, libraries, and drivers. The main memory 204, in some embodiments, may also include the cache 250 described above and one or more of the registers 240 capable of storing credit data, as described above.

The platform interconnect 206 (also referred to herein as a high speed platform fabric) may be embodied as any circuitry and/or components capable of facilitating input/output operations with the CPU 202, the main memory 204, and other components of the compute device 130. For example, the platform interconnect 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the platform interconnect 206 may form a portion of a system-on-a-chip (SoC) and be incorporated, along with one or more of the CPU 202, the main memory 204, and other components of the compute device 130, on a single integrated circuit chip. The platform interconnect 206 may connect the components of the compute device 130 through multiple channels 260, 262 which may utilize different communication protocols to transmit messages. In some embodiments, the messages may be transmitted through different rings, which may be embodied as any physical or virtual (e.g., messages tagged with an indicator of the type of ring) separation between messages of different types (e.g., request messages, data messages, acknowledgement messages, error messages). Further, in some embodiments, the platform quality of service logic unit 220 may be included in the platform interconnect 206.

The communication circuitry 208 may be embodied as any communication circuit, device, or collection thereof, capable of enabling communications over the network 160 between the compute device 130 and another device (e.g., the orchestrator server 140 and/or another compute device 130). The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes a network interface controller (NIC) 210, which may also be referred to as a host fabric interface (HFI). The communication circuitry 208 may be located on silicon separate from the CPU 202, or the communication circuitry 208 may be included in a multi-chip package with the CPU 202, or even on the same die as the CPU 202. The NIC 210 may be embodied as one or more add-in-boards, daughtercards, network interface cards, controller chips, chipsets, specialized components such as a field programmable gate array (FPGA) or application specific integrated circuit (ASIC), or other devices that may be used by the compute device 130 to connect with another device (e.g., the orchestrator server 140 and/or another compute device 130). In some embodiments, NIC 210 may be embodied as part of a system-on-a-chip (SoC) that includes one or more processors, or included on a multichip package that also contains one or more processors. In some embodiments, the NIC 210 may include a local processor (not shown) and/or a local memory (not shown) that are both local to the NIC 210. In such embodiments, the local processor of the NIC 210 may be capable of performing one or more of the functions of the CPU 202 described herein. Additionally or alternatively, in such embodiments, the local memory of the NIC 210 may be integrated into one or more components of the compute device 130 at the board level, socket level, chip level, and/or other levels. In the illustrative embodiment, the NIC 210 includes one or more of the registers 240 described above, capable of storing credit information for controlling the transmission of messages through the platform interconnect 206 (e.g., the high speed platform fabric).

The one or more illustrative data storage devices 212, may be embodied as any type of devices configured for short-term or long-term storage of data such as, for example, memory devices and circuits, memory cards, hard disk drives, solid-state drives, or other data storage devices. Each data storage device 212 may include a system partition that stores data and firmware code for the data storage device 212. Each data storage device 212 may also include an operating system partition that stores data files and executables for an operating system. In the illustrative embodiment, each data storage device 212 includes one or more of the registers 240 described above, capable of storing credit information for controlling the transmission of messages through the platform interconnect 206.

Additionally or alternatively, the compute device 130 may include one or more peripheral devices 214. Such peripheral devices 214 may include any type of peripheral device commonly found in a compute device such as a display, speakers, a mouse, a keyboard, and/or other input/output devices, interface devices, and/or other peripheral devices. Further, the compute device 130 may include one or more other resources 216, such as one or more accelerators, which each may communicate with each other and/or the other components of the compute device 130 through specific channels, which may be virtual channels (also referred to herein as "rings").

The orchestrator server 140 and the client device 150 may have components similar to those described in FIG. 2. As such, the description of those components of the compute device 130 is equally applicable to the description of components of the orchestrator server 140 and the client device 150 and is not repeated herein for clarity of the description, with the exception that, in the illustrative embodiment, the orchestrator server 140 and the client device 150 may not include the platform quality of service logic unit 220 and the registers 240. It should be appreciated that any of the orchestrator server 140 and the client device 150 may include other components, sub-components, and devices commonly found in a computing device, which are not discussed above in reference to the compute device 130 and not discussed herein for clarity of the description.

As described above, the compute devices 130, the orchestrator server 140, and the client device 150 are illustratively in communication via the network 160, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
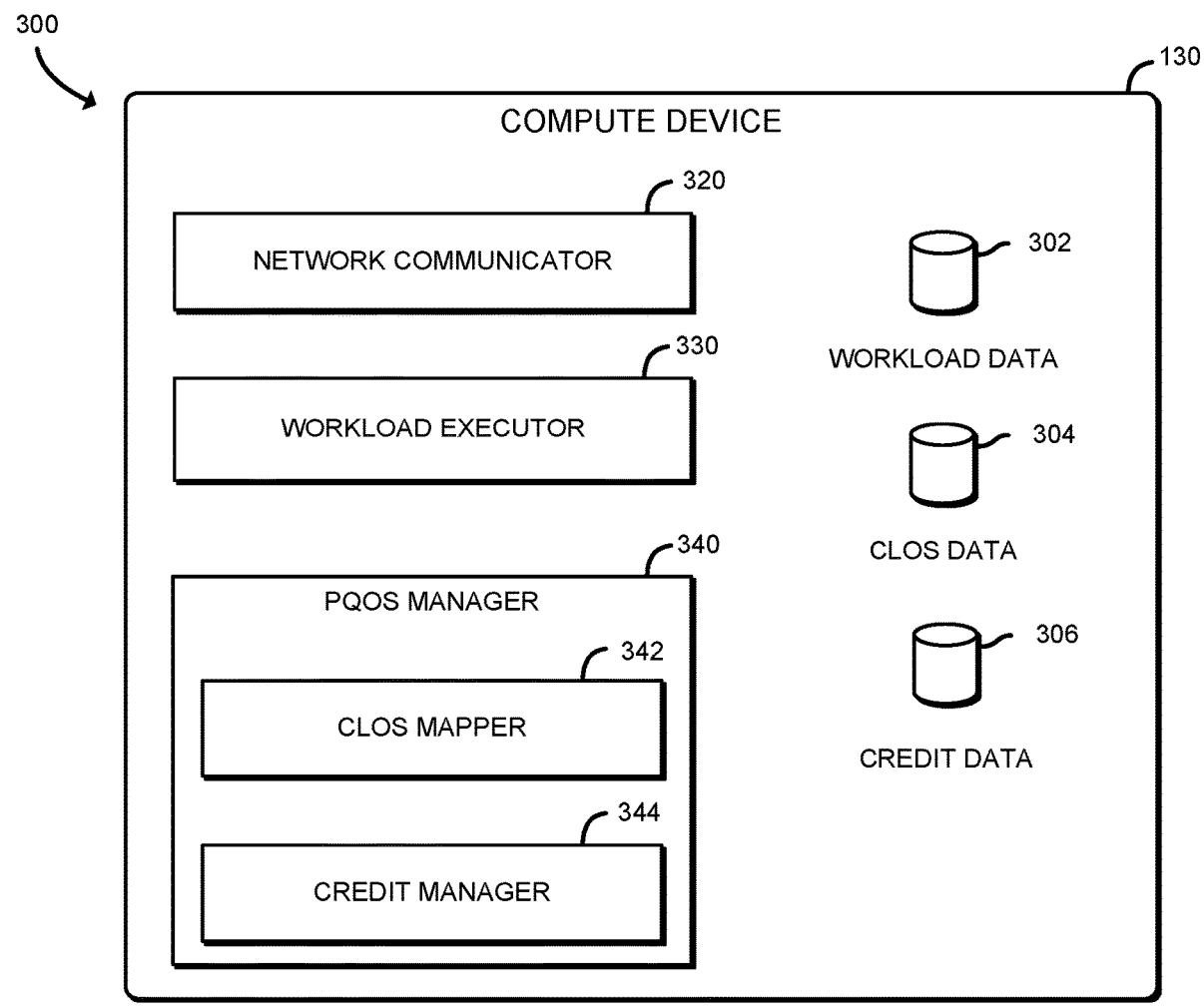
FIG. 3 is a simplified block diagram of at least one embodiment of an environment that may be established by a compute device of FIGS. 1 and 2.

Referring now to FIG. 3, in the illustrative embodiment, each compute device 130 may establish an environment 300 during operation. The illustrative environment 300 includes a network communicator 320, a workload executor 330, and a platform quality of service manager 340. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, workload executor circuitry 330, platform quality of service manager circuitry 340, etc.). It should be appreciated that, in such embodiments, one or more of the network communicator circuitry 320, workload executor circuitry 330, or platform quality of service manager circuitry 340 may form a portion of one or more of the CPU 202, the main memory 204, the platform interconnect 206, and/or other components of the compute device 130.

In the illustrative embodiment, the environment 300 includes workload data 302, which may be embodied as any data indicative of identifiers of workloads assigned to the compute device 130, identifications of the cores 230 to which the workloads are assigned, processor-executable instructions of the workloads, and/or configuration data usable by the compute device 130 to execute the workloads. Additionally, in the illustrative embodiment, the environment 300 includes class of service data 304 indicative of capacities (e.g., throughputs) of various resources of the compute device 130 that are to be allocated to each workload (e.g., to each core 230 executing a corresponding workload) to satisfy corresponding quality of service targets. The class of service data may be embodied as a table or map that associates a given class of service identifier (e.g., "1", "2", etc.) with a corresponding capacity (e.g., a percentage of total capacity such as 20% or a numeric amount such as 10 gigabytes per second), a given resource (e.g., memory, data storage, etc.), and a given workload (e.g., a workload identifier). Further, in the illustrative embodiment, the environment 300 includes credit data 306 which may be embodied as any data indicative of a number of credits presently assigned to each core 230 and resource (e.g., the memory 204, the NIC 210, the data storage device(s) 240). Additionally, the credit data 206 may include data indicative of a function for converting a class of service to a corresponding number of credits. For example, the credit data 306 may include a function that divides the number of gigabytes per second of capacity of a resource allocated for a particular workload (e.g., a memory throughput of 6 gigabytes per second for workload A) by a typical size for a message transmitted though the platform interconnect 206 (e.g., one gigabyte per message), to provide the number of credits to be associated with each resource for each workload. In the illustrative embodiment, the credit data 206 may be stored in the registers 240 and/or the platform quality of service logic unit 220.

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute device 130, respectively. To do so, the network communicator 320 is configured to receive and process data packets and to prepare and send data packets to a system or compute device (e.g., the orchestrator server 140). Accordingly, in some embodiments, at least a portion of the functionality of the network communicator 320 may be performed by the communication circuitry 208, and, in the illustrative embodiment, by the NIC 210.

The workload executor 330, which may be embodied as hardware, firmware, software, virtualized hardware, emulated architecture, and/or a combination thereof as discussed above, is configured to execute workloads assigned to the compute device 130 and generate traffic through the platform interconnect 206 as the workloads are executed. As described herein, the messages may include requests from cores 230 of the CPU 202 to the resources (e.g., the memory 204, the NIC 210, etc.) to read or write data, and response messages from the resources with requested data, acknowledgements, or errors.

The platform quality of service manager 340, which may be embodied as hardware, firmware, software, virtualized hardware, emulated architecture, and/or a combination thereof, is configured to obtain the class of service data for each workload to be executed, determine amounts of credits to be associated with each component of the compute device 130 that communicates through the platform interconnect 206 in accordance with the class of service data (e.g., more credits for classes of service indicative of relatively higher memory throughputs, relatively higher communication circuitry throughput, etc. and fewer credits for classes of service indicative of relatively lower throughputs from the resources), associate the credits with the components of the compute device 130, such as by writing credit amounts to the registers 240 associated with the components, and selectively allowing or delaying the transmission of messages between the components as a function of whether the component that is to send a message has sufficient credits (e.g., a threshold amount, such as one credit per message). To do so, in the illustrative embodiment, the platform quality of service manager 340 includes a class of service mapper 342 and a credit manager 344. The class of service mapper 342, in the illustrative embodiment, is configured to determine a class of service associated with a particular workload and resource to be utilized by a core 230 of the CPU 202 in the execution of the workload and determine the corresponding actual amount of the resource (e.g., a throughput measured in gigabytes per second) to be allocated to the workload by referencing the class of service data 304. The credit manager 344, in the illustrative embodiment, is configured to determine the number of credits to be initially assigned to each resource (e.g., the memory 204, the NIC 210, etc.) for each workload, decrease the amount of available credits associated with a resource and workload when the resource sends a message related to the workload (e.g., a message containing requested data), increase the amount of available credits after a message has been received and processed by the target component (e.g., the component to which the message was to be sent to such as a core 230 or a resource such as the memory 204, the NIC 210, a data storage device 212, etc.), and delay the transmission of messages through the platform interconnect 206 when the sending component does not have enough credits (e.g., a predefined number) for the message.

It should be appreciated that each of the class of service mapper 342 and the credit manager 344 may be separately embodied as hardware, firmware, software, virtualized hardware, emulated architecture, and/or a combination thereof. For example, the class of service mapper 342 may be embodied as a hardware component, while the credit manager 344 is embodied as a virtualized hardware component or as some other combination of hardware, firmware, software, virtualized hardware, emulated architecture, and/or a combination thereof.

Figure 4:
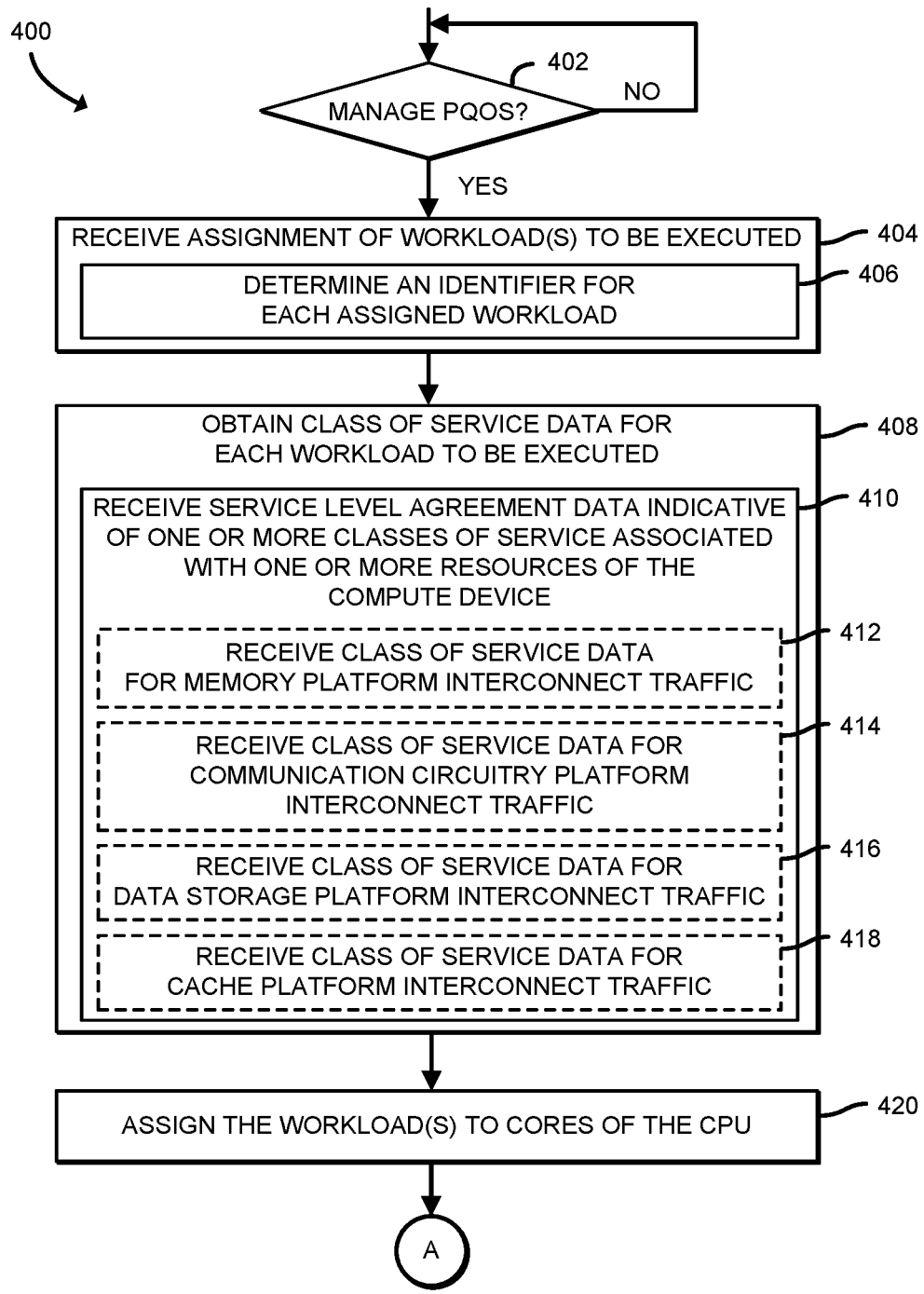
FIGS. 4-6 are a simplified block diagram of at least one embodiment of a method for managing quality of service for a platform interconnect that may be performed by a compute device of FIGS. 1 and 2.

Referring now to FIG. 4, in use, each compute device 130 may execute a method 400 for managing quality of service for a platform interconnect 206. The method 400 begins with block 402 in which the compute device 130 determines whether to manage platform quality of service of the compute device 130, including the quality of service of the platform interconnect 206. In doing so, in the illustrative embodiment, the compute device 130 may determine whether the CPU 202 includes the platform quality of service logic unit 220, such as by checking a register of the CPU 202 for a predefined value indicative of the presence of the platform quality of service logic unit 220. In other embodiments, the compute device 130 may determine whether to manage platform quality of service based on other factors. Regardless, in response to a determination to manage platform quality of service, the method 400 advances to block 404 in which the compute device 130 receives an assignment of one or more workloads to be executed. The compute device 130 may receive the assignment of the one or more workloads from the orchestrator server 140 and/or from another source, such as a user interacting with the compute device 130 directly (e.g., through a user interface). As indicated in block 406, the compute device 130, in the illustrative embodiment, determines an identifier for each assigned workload or a set of workloads (e.g., workloads to be executed by the same core 230 of the CPU 202). The compute device 130 may determine the identifiers by receiving the identifiers from the orchestrator server 140, such as when the workloads are assigned, or by another method (e.g., assigning a number to each workload as a function of the order in which the workloads were assigned, a hash based on a portion of the code to be executed in the workload, a name of an executable file associated with the workload, etc.).

Subsequently, the method 400 advances to block 408 in which the compute device 130 obtains class of service data (e.g., the class of service data 304) for each workload to be executed. In other embodiments, the compute device 130 may obtain the class of service data 304 prior to receiving the assignments. In yet other embodiments, the compute device 130 may receive the class of service data 304 concurrently with receipt of the assignment of the applications to execute (e.g., as metadata associated with the applications, as parameters to one or more assignment requests, etc.).

In obtaining the class of service data 304, the compute device 130 obtains service level agreement data indicative of one or more classes of service associated with one or more resources of the compute device 130, as indicated in block 410. In doing so, the compute device 130 may receive class of service data 304 for platform interconnect traffic related to the main memory 204, as indicated in block 412. Additionally or alternatively, the compute device 130 may receive class of service data 304 for platform interconnect traffic related to the communication circuitry 208 (e.g., the NIC 210), as indicated in block 414. The compute device 130 may also receive class of service data 304 for platform interconnect traffic related to the data storage (e.g., the one or more data storage devices 212), as indicated in block 416. Further, the compute device 130 may receive class of service data 304 for platform interconnect traffic related to the cache 250, as indicated in block 418. In the illustrative embodiment, the class of service data 304 may be formatted as data indicative of a resource type (e.g., memory bandwidth, network interface controller bandwidth, data storage bandwidth, cache bandwidth, etc.), a class of service identifier associated with the resource type (e.g., "1", "2", etc.), and an amount of each resource to be allocated for each class of service identifier. Further, the class of service data 304, in the illustrative embodiment, includes an assignment of a class of service for each resource type for each workload (e.g., a mapping between a workload identifier, a resource type, and a class of service). As such, for a service level agreement in which the compute device 130 is to provide a relatively higher quality of service (e.g., relatively lower latency and relatively higher throughput), the classes of service for the resources associated with workloads performed on behalf of that customer may be greater, allocating more of the bandwidth of each resource to those workloads (e.g., to a core 230 that is to execute the workloads) than for workloads associated with customers who agreed to relatively lower qualities of service. Accordingly, the class of service associated with each resource for each workload affects the amount of traffic, such as requests for data, and responses with the data, through the platform interconnect 206, as the corresponding workload is executed. Subsequently, the compute device 130 assigns the workloads to the cores 230 of the CPU 202 for execution, as indicated in block 420. In doing so, the compute device 130 may assign each workload to a different core 230 or may consolidate two or more workloads (e.g., workloads associated with the same customer) on the same core 230. In other embodiments, the compute device 130 assigns the workloads to the cores 230 prior to obtaining the class of service data 304. Subsequently, the method 400 advances to block 422 of FIG. 5 in which the compute device 130 determines amounts of credits to be assigned to the components (e.g., the cores 230, and the resources including the main memory 204, the communication circuitry 208, the data storage device(s) 212, and/or the cache 250) of the compute device 130 to control different types of platform interconnect traffic as a function of the class of service data 304 obtained in block 408 of FIG. 4.

Figure 5:
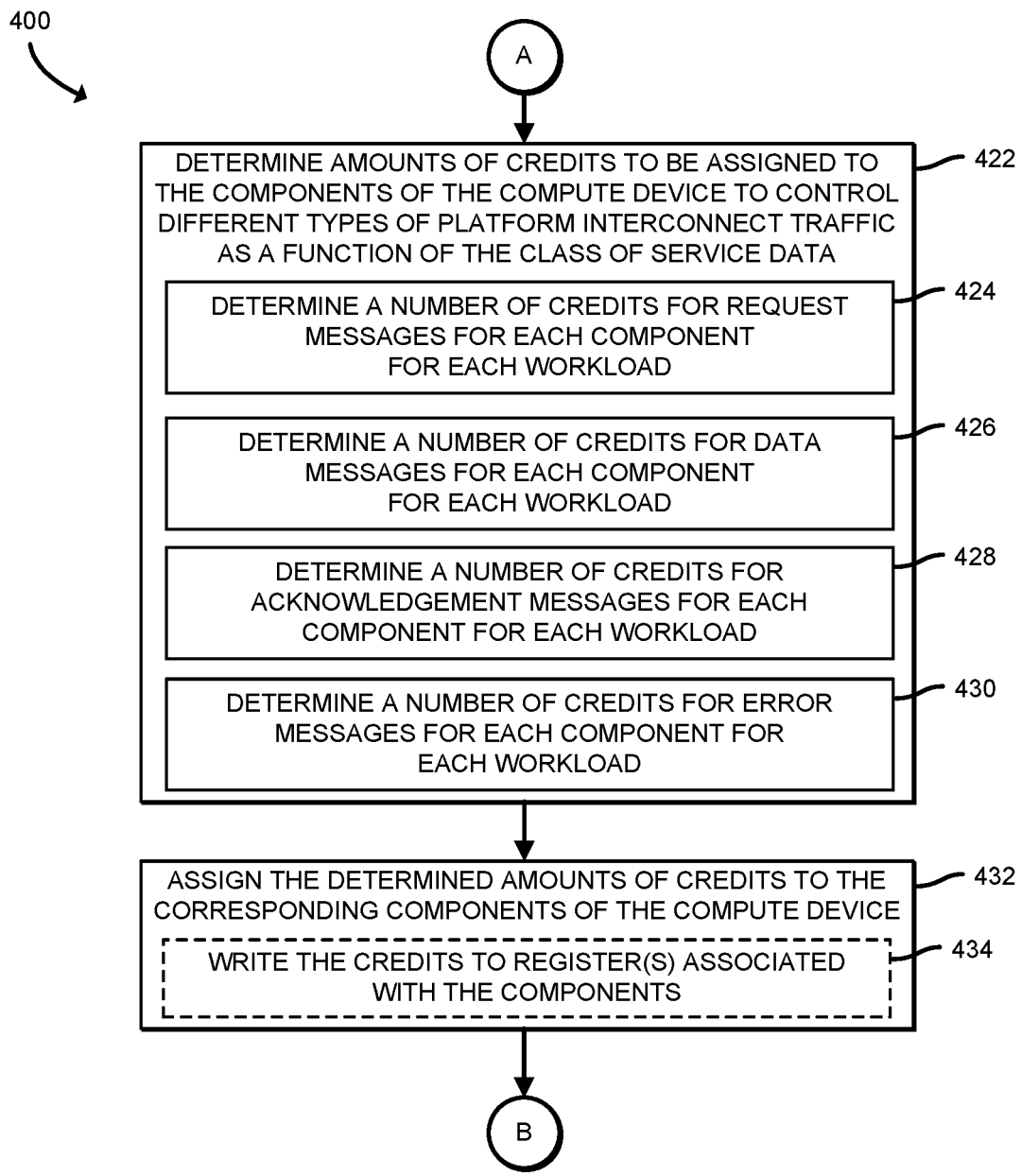

Referring now to FIG. 5, in determining the amounts of credits to be assigned, the compute device 130 may determine a number of credits for request messages (e.g., requests to read or write data) for each component for each workload, as indicated in block 424. Additionally, as indicated in block 426, the compute device 130 may determine a number of credits for data messages (e.g., messages containing requested data or messages containing data to be written) for each component for each workload, as indicated in block 426. Further, as indicated in block 428, the compute device 130 may determine a number of credits for acknowledgement messages (e.g., messages from one component indicative of an acknowledgement of a message from another component) for each component for each workload, as indicated in block 428. Additionally, the compute device 130 may determine a number of credits for error messages for each component for each workload, as indicated in block 430. In determining the amounts of credits, the compute device 130 may apply a function for converting a class of service to a corresponding number of credits. For example, the compute device 130 may divide the number of gigabytes per second of capacity allocated to a particular workload and resource (e.g., a memory throughput of 6 gigabytes per second for workload A), pursuant to the class of service data 304, by a typical size for a message transmitted though the platform interconnect 206 (e.g., one gigabyte per message), to provide the number of credits to be associated with each component for each workload. Subsequently, in block 432, the compute device 130 assigns the determined amount of credits to the corresponding components of the compute device 130. In doing so, the compute device 130 may write the amount of credits to registers (e.g., the registers 240) associated with the components, as indicated in block 434. Afterwards, the method 400 advances to block 436 of FIG. 6 in which the compute device 130 begins execution of the assigned workloads.

Figure 6:
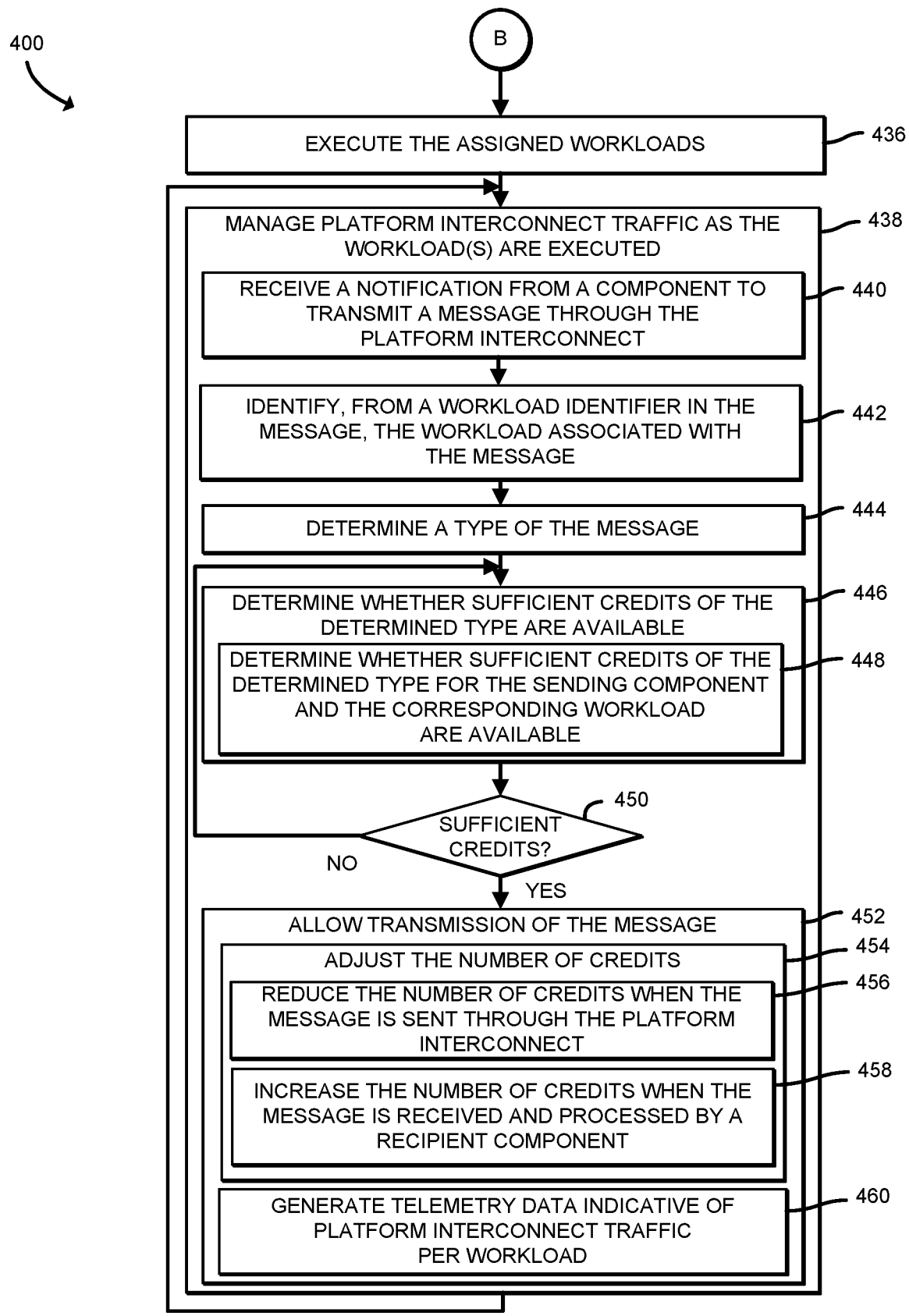

Referring now to FIG. 6, once the compute device 130 has begun execution of the workloads, as indicated in block 436, the compute device 130 manages the traffic through the platform interconnect 206 as the workloads are executed by the cores 230, as indicated in block 438. In doing so, the compute device 130, such as the platform quality of service logic unit 220, may receive a notification from a component (e.g., a core 230) to transmit a message (e.g., a request message) through the platform interconnect 206, as indicated in block 440. The notification may be embodied, for example, as an addition of the message to a queue of messages to be transmitted through the platform interconnect 206. In response, the compute device 130 identifies, from a workload identifier associated with the message (e.g., included in the message to be sent), the workload associated with the message, as indicated in block 442. Further, in block 444, the compute device 130 determines the type of message to be sent. For example, the type of message may be a request message, a data message, an acknowledgement message, an error message, or another type of message for which a corresponding number of credits was assigned in block 422 of FIG. 4. The compute device 130 may determine the type of message by identifying a parameter in the message that is indicative of the type of message, by the type of queue in which the message was placed (e.g., a request message queue, a data message queue, an acknowledgement message queue, an error message queue, etc.), or by another method.

Regardless, the method 400 subsequently advances to block 446 in which the compute device 130 determines whether sufficient credits of the determined type are available to allow the message to be sent through the platform interconnect 206. In doing so, the compute device 130 determines whether sufficient credits of the determined type for the component that is to send the message for the corresponding workload are available (e.g., in the register 240 associated with the component), as indicated in block 448. For example, the compute device 130 may determine a number of credits required to send the message (e.g., one credit per message) and determine whether the register 240 associated with the component indicates that at least the determined number of required credits (e.g., one credit) are available for use in connection with the workload and the message type. In block 450, the compute device 130 determines the subsequent actions to perform as a function of whether sufficient credits are available. If sufficient credits are not available, the method 400 loops back to block 446 to once again determine whether sufficient credits are available. As described herein, the number of credits available may decrease and increase over time as messages are sent to recipient components through the platform interconnect 206 and processed by the recipient components.

Referring back to block 450, if the compute device 130 instead determines that sufficient credits are available, the method 400 advances to block 452 in which the compute device 130 (e.g., the platform quality of service logic unit 220) allows transmission of the message through the platform interconnect 206 (e.g., removal of the message from the queue, serialization of the message for transmission through the platform interconnect 206, and deserialization the message at the recipient component). In doing so, the compute device 130 adjusts the number of corresponding credits, as indicated in block 454. In the illustrative embodiment, in adjusting the number of credits, the compute device 130 reduces the number of credits when the message is sent through the platform interconnect 206, as indicated in block 456 and increases the number of credits when the message is received and processed by the recipient component (i.e., the component to which the message was directed), as indicated in block 458. As indicated in block 460, during the transmission of messages through the platform interconnect 206, the compute device 130 may generate telemetry data which may be embodied as any data indicative of the amounts and types (e.g., requests messages, data messages, acknowledgement messages, error messages) of traffic transmitted through the platform interconnect 206 for each workload and resource. The telemetry data may be sent to the orchestrator server 140 and/or stored locally (e.g., in the data storage devices 212) for analysis (e.g. to determine whether traffic through the platform interconnect 206 has successfully been apportioned in accordance with the service level agreements with customers). Regardless, in the illustrative embodiment, the method 400 loops back to block 438 to continue managing platform interconnect traffic as the workloads are executed.

Figure 7:
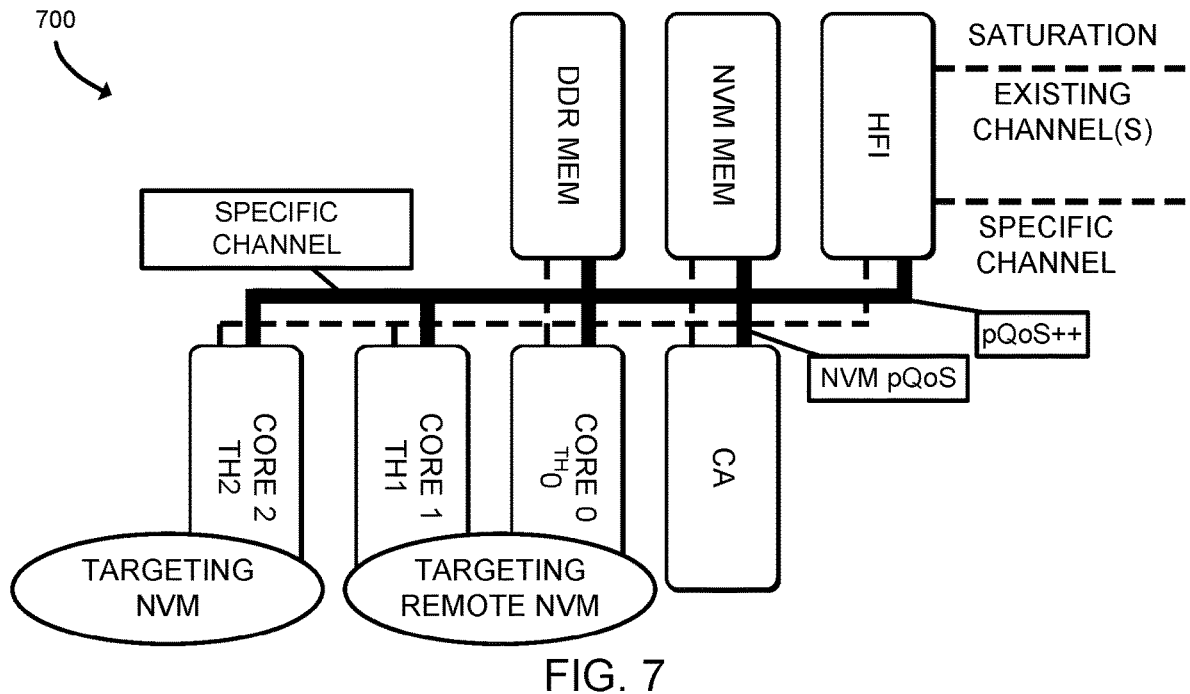
FIG. 7 is a simplified block diagram of at least one embodiment of a fabric scheme that may be established in the compute device of FIGS. 1 and 2.
Figure 8:
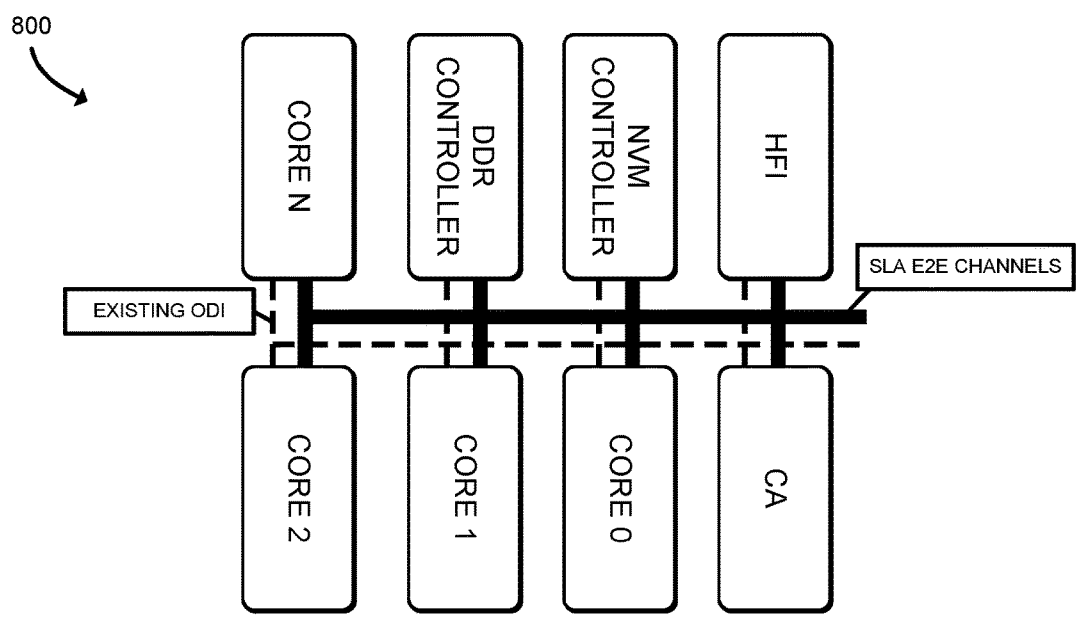
FIG. 8 is a simplified block diagram of different channels that may each have a different class of service for communication of data between components of the compute device of FIGS. 1 and 2.
Figure 9:
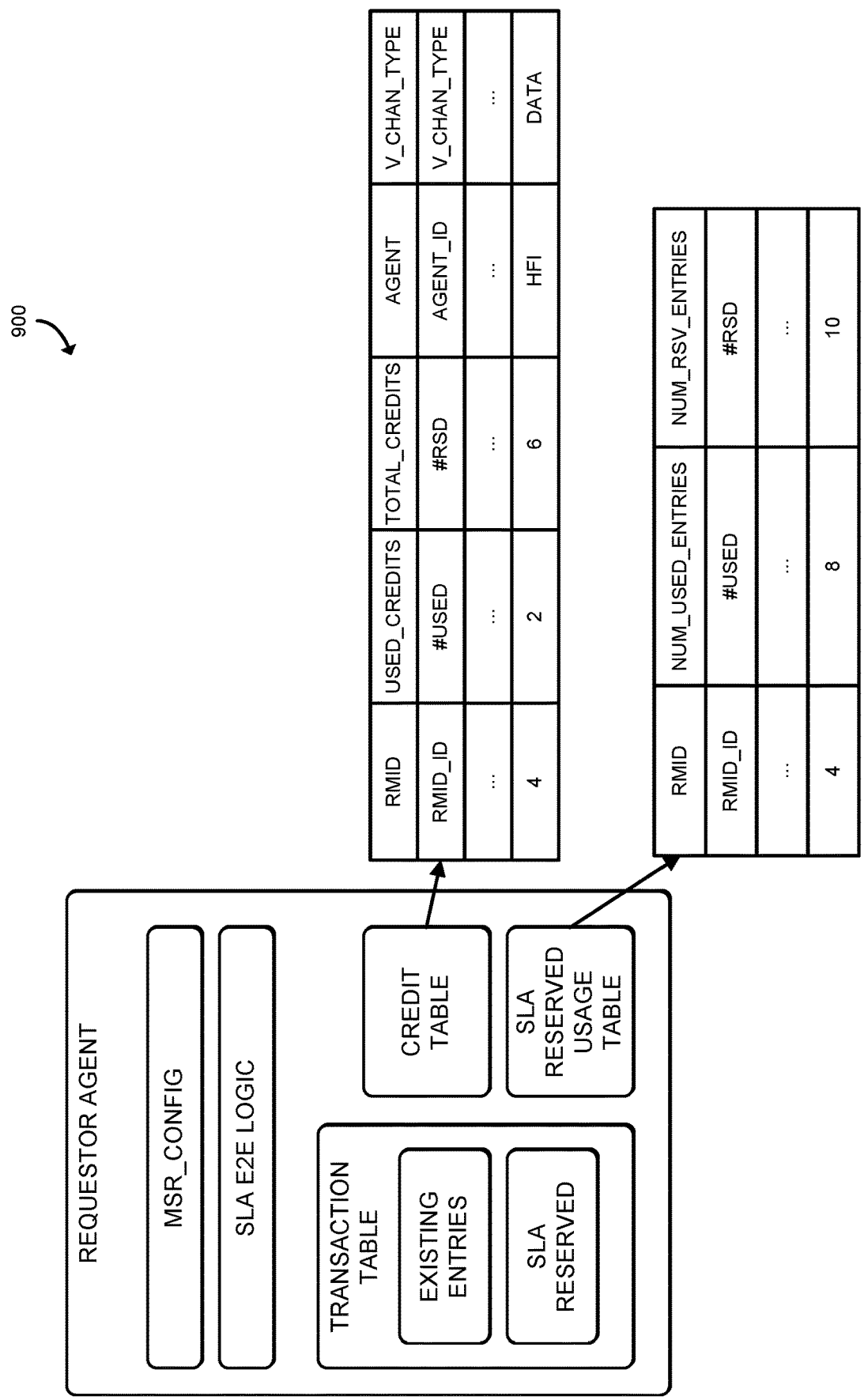
FIG. 9 is a simplified block diagram of a credit scheme that may be established for communication between different components of the compute device of FIGS. 1 and 2.

Referring now to FIG. 7, a fabric scheme 700 may be established by the compute device 130 in which virtual channels may exist between any pair of components (e.g., agents) connected through the platform interconnect 206. In the scheme 700, certain channels may be established within other channels. Referring now to FIG. 8, the platform interconnect 206 of the compute device may provide different channels 800, which may each have a different class of service for communication of data between components of the compute device 130. For example, a certain class of service for a 1 GB/sec data transfer rate between core 1 (e.g., an agent) and the HFI (e.g., another agent) through one type of channel (e.g., a data virtual channel) may be established by the compute device 130. Concurrently, the compute device 130 may establish another virtual channel with a different class of service (e.g., 2 GB/sec data transfer rate) between other components, such as between Core 0 and the DDR controller. Referring now to FIG. 9, a credit scheme 900 may be established by the compute device 130 for communication between different components. In the scheme 900, the compute device 130 may assign credits (e.g., the credit data 306 of FIG. 3) for a particular component (e.g., a requestor agent) to send data to another component (e.g., another agent) through a particular virtual channel type. As described above, the compute device 130 may establish multiple channels (e.g., virtual channels) through the platform interconnect 206 to enable different classes of service and credits to be associated with the communication of information through each respective channel. The credits associated with each component (e.g., a requestor agent) may be stored in a model specific register in association with an identifier (e.g., an RM_ID) of the corresponding component.

EXAMPLES

Illustrative examples of the technologies disclosed herein are provided below. An embodiment of the technologies may include any one or more, and any combination of, the examples described below.

Example 1 includes a compute device to manage quality of service of a platform interconnect, the compute device comprising one or more processors; one or more resources capable of being utilized by the one or more processors; a platform interconnect to facilitate communication of messages among the one or more processors and the one or more resources; one or more memory devices having stored therein a plurality of instructions that, when executed by the one or more processors, cause the compute device to obtain class of service data for one or more workloads to be executed by the compute device, wherein the class of service data is indicative of a capacity of one or more of the resources to be utilized in the execution of each corresponding workload; execute the one or more workloads; and manage the amount of traffic transmitted through the platform interconnect for each workload as a function of the class of service data of the corresponding workload as the one or more workloads are executed.

Example 2 includes the subject matter of Example 1, and wherein the plurality of instructions, when executed, further cause the compute device to determine, as a function of the class of service data, amounts of credits to be assigned to the one or more processors and the one or more resources to control message traffic through the platform interconnect.

Example 3 includes the subject matter of any of Examples 1 and 2, and wherein to determine the amounts of credits comprises to determine a number of credits for request messages to be transmitted through the platform interconnect.

Example 4 includes the subject matter of any of Examples 1-3, and wherein to determine the amounts of credits comprises to determine a number of credits for data messages to be transmitted through the platform interconnect.

Example 5 includes the subject matter of any of Examples 1-4, and wherein to determine the amounts of credits comprises to determine a number of credits for acknowledgment messages to be transmitted through the platform interconnect.

Example 6 includes the subject matter of any of Examples 1-5, and wherein to determine the amounts of credits comprises to determine a number of credits for error messages to be transmitted through the platform interconnect.

Example 7 includes the subject matter of any of Examples 1-6, and wherein the plurality of instructions, when executed, further cause the compute device to write the determined amounts of credits to one or more registers.

Example 8 includes the subject matter of any of Examples 1-7, and wherein to manage the amount of traffic through the platform interconnect for each workload comprises to obtain a notification from a component of the compute device to transmit a message through the platform interconnect; determine a type of the message associated with the notification; determine whether a threshold number of credits of the determined type are available; and allow, in response to a determination that the threshold number of credits of the determined type are available, transmission of the message through the platform interconnect.

Example 9 includes the subject matter of any of Examples 1-8, and wherein to manage the amount of traffic through the platform interconnect for each workload further comprises to delay, in response to a determination that the threshold number of credits of the determined type are not available, transmission of the message through the platform interconnect.

Example 10 includes the subject matter of any of Examples 1-9, and wherein the plurality of instructions, when executed, further cause the compute device to adjust the number of credits after allowing transmission of the message.

Example 11 includes the subject matter of any of Examples 1-10, and wherein to adjust the number of credits comprises to reduce the number of credits when the message is sent through the platform interconnect.

Example 12 includes the subject matter of any of Examples 1-11, and wherein the plurality of instructions, when executed, further cause the compute device to increase the number of credits when the message is received by a recipient component of the compute device.

Example 13 includes the subject matter of any of Examples 1-12, and wherein to obtain class of service data comprises to obtain class of service data indicative of a capacity of the one or more memory devices to be utilized in the execution of each workload.

Example 14 includes the subject matter of any of Examples 1-13, and wherein to obtain class of service data comprises to obtain class of service data indicative of a capacity of a network interface controller to be utilized in the execution of each workload.

Example 15 includes the subject matter of any of Examples 1-14, and wherein to obtain class of service data comprises to obtain class of service data indicative of a capacity of one or more data storage devices to be utilized in the execution of each workload.

Example 16 includes the subject matter of any of Examples 1-15, and wherein to obtain class of service data comprises to obtain class of service data indicative of a capacity of a cache to be utilized in the execution of each workload.

Example 17 includes the subject matter of any of Examples 1-16, and wherein the plurality of instructions, when executed, further cause the compute device determine an amount of credit to be assigned for communication of data between pairs of the resources with different virtual channels, wherein the virtual channels can be grouped by virtual channel types.

Example 18 includes a method for managing quality of service of a platform interconnect of a compute device, the method comprising obtaining, by the compute device, class of service data for one or more workloads to be executed by the compute device, wherein the class of service data is indicative of a capacity of one or more resources to be utilized by one or more processors coupled to the resources through a platform interconnect in the execution of each corresponding workload; executing, by the compute device, the one or more workloads; and managing, by the compute device, the amount of traffic transmitted through the platform interconnect for each workload as a function of the class of service data of the corresponding workload as the one or more workloads are executed.

Example 19 includes the subject matter of Example 18, and further including determining, by the compute device and as a function of the class of service data, amounts of credits to be assigned to the one or more processors and the one or more resources to control message traffic through the platform interconnect.

Example 20 includes the subject matter of any of Examples 18 and 19, and wherein determining the amounts of credits comprises determining a number of credits for request messages to be transmitted through the platform interconnect.

Example 21 includes the subject matter of any of Examples 18-20, and wherein determining the amounts of credits comprises determining a number of credits for data messages to be transmitted through the platform interconnect.

Example 22 includes the subject matter of any of Examples 18-21, and wherein determining the amounts of credits comprises determining a number of credits for acknowledgment messages to be transmitted through the platform interconnect.

Example 23 includes the subject matter of any of Examples 18-22, and wherein determining the amounts of credits comprises determining a number of credits for error messages to be transmitted through the platform interconnect.

Example 24 includes the subject matter of any of Examples 18-23, and further including writing, by the compute device, the determined amounts of credits to one or more registers.

Example 25 includes the subject matter of any of Examples 18-24, and wherein managing the amount of traffic through the platform interconnect for each workload comprises obtaining, by the compute device, a notification from a component of the compute device to transmit a message through the platform interconnect; determining, by the compute device, a type of the message associated with the notification; determining, by the compute device, whether a threshold number of credits of the determined type are available; and allowing, by the compute device and in response to a determination that the threshold number of credits of the determined type are available, transmission of the message through the platform interconnect.

Example 26 includes the subject matter of any of Examples 18-25, and wherein managing the amount of traffic through the platform interconnect for each workload further comprises delaying, by the compute device and in response to a determination that the threshold number of credits of the determined type are not available, transmission of the message through the platform interconnect.

Example 27 includes the subject matter of any of Examples 18-26, and further including adjusting, by the compute device, the number of credits after allowing transmission of the message.

Example 28 includes the subject matter of any of Examples 18-27, and wherein adjusting the number of credits comprises reducing the number of credits when the message is sent through the platform interconnect.

Example 29 includes the subject matter of any of Examples 18-28, and further including increasing, by the compute device, the number of credits when the message is received by a recipient component of the compute device.

Example 30 includes the subject matter of any of Examples 18-29, and wherein obtaining class of service data comprises obtaining class of service data indicative of a capacity of the one or more memory devices to be utilized in the execution of each workload.

Example 31 includes the subject matter of any of Examples 18-30, and wherein obtaining class of service data comprises obtaining class of service data indicative of a capacity of a network interface controller to be utilized in the execution of each workload.

Example 32 includes the subject matter of any of Examples 18-31, and wherein obtaining class of service data comprises obtaining class of service data indicative of a capacity of one or more data storage devices to be utilized in the execution of each workload.

Example 33 includes the subject matter of any of Examples 18-32, and wherein obtaining class of service data comprises obtaining class of service data indicative of a capacity of a cache to be utilized in the execution of each workload.

Example 34 includes the subject matter of any of Examples 18-33, and further including determining, by the compute device, an amount of credit to be assigned for communication of data between pairs of the resources with different virtual channels, wherein the virtual channels can be grouped by virtual channel types.

Example 35 includes one or more machine-readable storage media comprising a plurality of instructions stored thereon that, in response to being executed, cause a compute device to perform the method of any of Examples 18-34.

Example 36 includes a compute device to manage quality of service of a platform interconnect, the compute device comprising one or more processors; one or more memory devices having stored therein a plurality of instructions that, when executed by the one or more processors, cause the compute device to perform the method of any of Examples 18-34.

Example 37 includes a compute device to manage quality of service of a platform interconnect, the compute device comprising one or more resources capable of being utilized by the one or more processors; a platform interconnect to facilitate communication of messages among the one or more processors and the one or more resources; platform quality of service manager circuitry to obtain class of service data for one or more workloads to be executed by the compute device, wherein the class of service data is indicative of a capacity of one or more of the resources to be utilized in the execution of each corresponding workload; and workload executor circuitry to execute the one or more workloads; wherein the platform quality of service manager circuitry is further to manage the amount of traffic transmitted through the platform interconnect for each workload as a function of the class of service data of the corresponding workload as the one or more workloads are executed.

Example 38 includes the subject matter of Example 37, and wherein the platform quality of service manager circuitry is further to determine, as a function of the class of service data, amounts of credits to be assigned to the one or more processors and the one or more resources to control message traffic through the platform interconnect.

Example 39 includes the subject matter of any of Examples 37 and 38, and wherein to determine the amounts of credits comprises to determine a number of credits for request messages to be transmitted through the platform interconnect.

Example 40 includes the subject matter of any of Examples 37-39, and wherein to determine the amounts of credits comprises to determine a number of credits for data messages to be transmitted through the platform interconnect.

Example 41 includes the subject matter of any of Examples 37-40, and wherein to determine the amounts of credits comprises to determine a number of credits for acknowledgment messages to be transmitted through the platform interconnect.

Example 42 includes the subject matter of any of Examples 37-41, and wherein to determine the amounts of credits comprises to determine a number of credits for error messages to be transmitted through the platform interconnect.

Example 43 includes the subject matter of any of Examples 37-42, and wherein the platform quality of service manager circuitry is further to write the determined amounts of credits to one or more registers.

Example 44 includes the subject matter of any of Examples 37-43, and wherein to manage the amount of traffic through the platform interconnect for each workload comprises to obtain a notification from a component of the compute device to transmit a message through the platform interconnect; determine a type of the message associated with the notification; determine whether a threshold number of credits of the determined type are available; and allow, in response to a determination that the threshold number of credits of the determined type are available, transmission of the message through the platform interconnect.

Example 45 includes the subject matter of any of Examples 37-44, and wherein to manage the amount of traffic through the platform interconnect for each workload further comprises to delay, in response to a determination that the threshold number of credits of the determined type are not available, transmission of the message through the platform interconnect.

Example 46 includes the subject matter of any of Examples 37-45, and wherein the platform quality of service manager circuitry is further to adjust the number of credits after allowing transmission of the message.

Example 47 includes the subject matter of any of Examples 37-46, and wherein to adjust the number of credits comprises to reduce the number of credits when the message is sent through the platform interconnect.

Example 48 includes the subject matter of any of Examples 37-47, and wherein the platform quality of service manager circuitry is further to increase the number of credits when the message is received by a recipient component of the compute device.

Example 49 includes the subject matter of any of Examples 37-48, and wherein to obtain class of service data comprises to obtain class of service data indicative of a capacity of the one or more memory devices to be utilized in the execution of each workload.

Example 50 includes the subject matter of any of Examples 37-49, and wherein to obtain class of service data comprises to obtain class of service data indicative of a capacity of a network interface controller to be utilized in the execution of each workload.

Example 51 includes the subject matter of any of Examples 37-50, and wherein to obtain class of service data comprises to obtain class of service data indicative of a capacity of one or more data storage devices to be utilized in the execution of each workload.

Example 52 includes the subject matter of any of Examples 37-51, and wherein to obtain class of service data comprises to obtain class of service data indicative of a capacity of a cache to be utilized in the execution of each workload.

Example 53 includes the subject matter of any of Examples 37-52, and wherein the platform quality of service manager circuitry is further to determine an amount of credit to be assigned for communication of data between pairs of the resources with different virtual channels, wherein the virtual channels can be grouped by virtual channel types.

Example 54 includes a compute device for managing quality of service of a platform interconnect of a compute device, the compute device comprising circuitry for obtaining class of service data for one or more workloads to be executed by the compute device, wherein the class of service data is indicative of a capacity of one or more resources to be utilized by one or more processors coupled to the resources through a platform interconnect in the execution of each corresponding workload; circuitry for executing the one or more workloads; and means for managing the amount of traffic transmitted through the platform interconnect for each workload as a function of the class of service data of the corresponding workload as the one or more workloads are executed.

Example 55 includes the subject matter of Example 54, and further including means for determining, as a function of the class of service data, amounts of credits to be assigned to the one or more processors and the one or more resources to control message traffic through the platform interconnect.

Example 56 includes the subject matter of any of Examples 54 and 55, and wherein the means for determining the amounts of credits comprises means for determining a number of credits for request messages to be transmitted through the platform interconnect.

Example 57 includes the subject matter of any of Examples 54-56, and wherein the means for determining the amounts of credits comprises means for determining a number of credits for data messages to be transmitted through the platform interconnect.

Example 58 includes the subject matter of any of Examples 54-57, and wherein the means for determining the amounts of credits comprises means for determining a number of credits for acknowledgment messages to be transmitted through the platform interconnect.

Example 59 includes the subject matter of any of Examples 54-58, and wherein the means for determining the amounts of credits comprises means for determining a number of credits for error messages to be transmitted through the platform interconnect.

Example 60 includes the subject matter of any of Examples 54-59, and further including circuitry for writing the determined amounts of credits to one or more registers.

Example 61 includes the subject matter of any of Examples 54-60, and wherein the means for managing the amount of traffic through the platform interconnect for each workload comprises circuitry for obtaining a notification from a component of the compute device to transmit a message through the platform interconnect; circuitry for determining a type of the message associated with the notification; circuitry for determining whether a threshold number of credits of the determined type are available; and circuitry for allowing, in response to a determination that the threshold number of credits of the determined type are available, transmission of the message through the platform interconnect.

Example 62 includes the subject matter of any of Examples 54-61, and wherein the means for managing the amount of traffic through the platform interconnect for each workload further comprises circuitry for delaying, in response to a determination that the threshold number of credits of the determined type are not available, transmission of the message through the platform interconnect.

Example 63 includes the subject matter of any of Examples 54-62, and further including means for adjusting the number of credits after allowing transmission of the message.

Example 64 includes the subject matter of any of Examples 54-63, and wherein the means for adjusting the number of credits comprises means for reducing the number of credits when the message is sent through the platform interconnect.

Example 65 includes the subject matter of any of Examples 54-64, and further including means for increasing the number of credits when the message is received by a recipient component of the compute device.

Example 66 includes the subject matter of any of Examples 54-65, and wherein the circuitry for obtaining class of service data comprises circuitry for obtaining class of service data indicative of a capacity of the one or more memory devices to be utilized in the execution of each workload.

Example 67 includes the subject matter of any of Examples 54-66, and wherein the circuitry for obtaining class of service data comprises circuitry for obtaining class of service data indicative of a capacity of a network interface controller to be utilized in the execution of each workload.

Example 68 includes the subject matter of any of Examples 54-67, and wherein the circuitry for obtaining class of service data comprises circuitry for obtaining class of service data indicative of a capacity of one or more data storage devices to be utilized in the execution of each workload.

Example 69 includes the subject matter of any of Examples 54-68, and wherein the circuitry for obtaining class of service data comprises circuitry for obtaining class of service data indicative of a capacity of a cache to be utilized in the execution of each workload.

Example 70 includes the subject matter of any of Examples 54-69, and further including circuitry for determining an amount of credit to be assigned for communication of data between pairs of the resources with different virtual channels, wherein the virtual channels can be grouped by virtual channel types.

The invention claimed is:

1. A compute device to manage quality of service of a platform interconnect, the compute device comprising:
one or more processors;
one or more resources capable of being utilized by the one or more processors;
a platform interconnect to facilitate communication of messages among the one or more processors and the one or more resources, wherein the platform interconnect comprises an on-chip connection in an integrated circuit chip and wherein the integrated circuit chip includes the platform interconnect, the one or more processors and the one or more resources;
one or more memory devices having stored therein a plurality of instructions that, when executed by the one or more processors, cause the compute device to:
obtain class of service data for one or more workloads to be executed by the compute device, wherein the class of service data is indicative of a capacity of one or more of the resources to be utilized in the execution of a corresponding workload;
execute the one or more workloads; and
manage an amount of traffic transmitted through the platform interconnect for at least one workload as a function of the class of service data of the at least one workload as the at least one workload is executed.

2. The compute device of claim 1, wherein the plurality of instructions, when executed, further cause the compute device to determine, as a function of the class of service data, amounts of credits to be assigned to the one or more processors and the one or more resources to control message traffic through the platform interconnect.

3. The compute device of claim 2, wherein to determine the amounts of credits comprises to determine a number of credits for request messages to be transmitted through the platform interconnect.

4. The compute device of claim 2, wherein to determine the amounts of credits comprises to determine a number of credits for data messages to be transmitted through the platform interconnect.

5. The compute device of claim 2, wherein to determine the amounts of credits comprises to determine a number of credits for acknowledgment messages to be transmitted through the platform interconnect.

6. The compute device of claim 2, wherein to determine the amounts of credits comprises to determine a number of credits for error messages to be transmitted through the platform interconnect.

7. The compute device of claim 2, wherein the plurality of instructions, when executed, further cause the compute device to write the determined amounts of credits to one or more registers.

8. The compute device of claim 2, wherein to manage the amount of traffic through the platform interconnect for each workload comprises to:
obtain a notification from a component of the compute device to transmit a message through the platform interconnect;
determine a type of the message associated with the notification;
determine whether a threshold number of credits of the determined type are available; and
allow, in response to a determination that the threshold number of credits of the determined type are available, transmission of the message through the platform interconnect.

9. The compute device of claim 8, wherein to manage the amount of traffic through the platform interconnect for the at least one workload further comprises to delay, in response to a determination that the threshold number of credits of the determined type are not available, transmission of the message through the platform interconnect.

10. The compute device of claim 8, wherein the plurality of instructions, when executed, further cause the compute device to adjust the number of credits of the determined type after allowing transmission of the message of the determined type.

11. The compute device of claim 10, wherein to adjust the number of credits comprises to reduce the number of credits when the message is sent through the platform interconnect.

12. The compute device of claim 11, wherein the plurality of instructions, when executed, further cause the compute device to increase the number of credits of the determined type based on the message is received by a recipient component of the compute device.

13. One or more non-transitory machine-readable storage media comprising a plurality of instructions stored thereon that, in response to being executed, cause a compute device to:
obtain class of service data for one or more workloads to be executed by the compute device, wherein the class of service data is indicative of a capacity of one or more resources to be utilized in the execution of a corresponding workload;
execute the one or more workloads; and
manage an amount of traffic transmitted through a platform interconnect for at least one workload as a function of the class of service data of the at least one workload as the at least one workload is executed, wherein the platform interconnect comprises an on-chip connection in an integrated circuit chip and wherein the integrated circuit chip includes the platform interconnect and the one or more resources.

14. The one or more non-transitory machine-readable storage media of claim 13, wherein the plurality of instructions, when executed, further cause the compute device to determine, as a function of the class of service data, amounts of credits to be assigned to one or more processors of the compute device and one or more resources to control message traffic through the platform interconnect.

15. The one or more non-transitory machine-readable storage media of claim 14, wherein to determine the amounts of credits comprises to determine a number of credits for request messages to be transmitted through the platform interconnect.

16. The one or more non-transitory machine-readable storage media of claim 14, wherein to determine the amounts of credits comprises to determine a number of credits for data messages to be transmitted through the platform interconnect.

17. The one or more non-transitory machine-readable storage media of claim 14, wherein to determine the amounts of credits comprises to determine a number of credits for acknowledgment messages to be transmitted through the platform interconnect.

18. The one or more non-transitory machine-readable storage media of claim 14, wherein to determine the amounts of credits comprises to determine a number of credits for error messages to be transmitted through the platform interconnect.

19. The one or more non-transitory machine-readable storage media of claim 14, wherein the plurality of instructions, when executed, further cause the compute device to write the determined amounts of credits to one or more registers.

20. The one or more non-transitory machine-readable storage media of claim 14, wherein to manage the amount of traffic through the platform interconnect for the at least one workload comprises to:
    obtain a notification from a component of the compute device to transmit a message through the platform interconnect;
    determine a type of the message associated with the notification;
    determine whether a threshold number of credits of the determined type are available; and
    allow, in response to a determination that the threshold number of credits of the determined type are available, transmission of the message through the platform interconnect.

21. The one or more non-transitory machine-readable storage media of claim 20, wherein to manage the amount of traffic through the platform interconnect for the at least one workload further comprises to delay, in response to a determination that the threshold number of credits of the determined type are not available, transmission of the message through the platform interconnect.

22. The one or more non-transitory machine-readable storage media of claim 20, wherein the plurality of instructions, when executed, further cause the compute device to adjust the number of credits of the determined type after allowing transmission of the message of the determined type.

23. The one or more non-transitory machine-readable storage media of claim 22, wherein to adjust the number of credits comprises to reduce the number of credits when the message is sent through the platform interconnect.

24. The one or more non-transitory machine-readable storage media of claim 23, wherein the plurality of instructions, when executed, further cause the compute device to increase the number of credits of the determined type based on the message is received by a recipient component of the compute device.

25. A compute device for managing quality of service of a platform interconnect of a compute device, the compute device comprising:
    circuitry for obtaining class of service data for one or more workloads to be executed by the compute device, wherein the class of service data is indicative of a capacity of one or more resources to be utilized by one or more processors coupled to the one or more resources through a platform interconnect in the execution of a corresponding workload, wherein the platform interconnect comprises an on-chip connection in an integrated circuit chip and wherein the integrated circuit chip includes the platform interconnect, the one or more processors and the one or more resources;
    circuitry for executing the one or more workloads; and
    means for managing an amount of traffic transmitted through the platform interconnect for at least one workload as a function of the class of service data of the at least one workload as the one or more workloads are executed.

26. A method for managing quality of service of a platform interconnect of a compute device, the method comprising:
    obtaining, by the compute device, class of service data for one or more workloads to be executed by the compute device, wherein the class of service data is indicative of a capacity of one or more resources to be utilized by one or more processors coupled to the resources through a platform interconnect in the execution of a corresponding workload and wherein the platform interconnect comprises an on-chip connection in an integrated circuit chip and wherein the integrated circuit chip includes the platform interconnect, the one or more processors and the one or more resources;
    executing, by the compute device, the one or more workloads; and
    managing, by the compute device, an amount of traffic transmitted through the platform interconnect for at least one workload as a function of the class of service data of the at least one workload as the one or more workloads are executed.

27. The method of claim 26, further comprising determining, by the compute device and as a function of the class of service data, amounts of credits to be assigned to the one or more processors and the one or more resources to control message traffic through the platform interconnect.

28. The method of claim 27, wherein determining the amounts of credits comprises determining a number of credits for request messages to be transmitted through the platform interconnect.

\* \* \* \* \*